United States Patent [19]

Shindo et al.

[11] Patent Number: 4,977,776

[45] Date of Patent: Dec. 18, 1990

[54] GAS MIXING DEVICE AND GAS ANALYZER MAKING USE OF THE SAME

[75] Inventors: Isao Shindo; Ryuji Tao, both of Katsuta; Kyoichi Ozawa, Mito, all of Japan

[73] Assignee: Hitachi, Ltd., Tokyo, Japan

[21] Appl. No.: 404,404

[22] Filed: Sep. 8, 1989

Related U.S. Application Data

[62] Division of Ser. No. 201,738, Jun. 3, 1988, Pat. No. 4,905,497.

[30] Foreign Application Priority Data

Jun. 5, 1987 [JP] Japan ................................ 62-139792

[51] Int. Cl.[5] ............................................ G01N 31/00

[52] U.S. Cl. ...................................... 73/1 G; 137/606

[58] Field of Search ............... 137/597, 599, 601, 606, 137/607; 73/864.81, 864.87, 1 G, 19

[56] References Cited

U.S. PATENT DOCUMENTS 3,464,434 9/1969 Nielsen .
4,151,738 5/1979 Hyer et al. .
4,209,300 6/1980 Thibault .
4,380,250 4/1983 Stoll .
4,474,889 10/1984 Terry et al. .
4,498,496 2/1985 Barcellona et al. .
4,512,953 4/1985 Marsoner et al. .
4,696,183 9/1987 Mitsumaki et al. .

FOREIGN PATENT DOCUMENTS 0107631 5/1984 European Pat. Off. .
1557189 3/1970 Fed. Rep. of Germany .
2049225 12/1980 United Kingdom .

*Primary Examiner*—Robert Raevis
*Attorney, Agent, or Firm*—Fay, Sharpe, Beall, Fagan, Minnich & McKee

[57] ABSTRACT

A gas mixing device of a blood gas analyzer has a substrate made of a material such as silicon and a plate having a flat smooth surface, made of a material such as glass. The plate is bonded to the substrate. The substrate has a plurality of fine elongated grooves extending between inlet and outlet ports formed in the plate. Different gases are introduced through the respective inlet ports, and combined with each other in the gas mixing device. The levels of flow resistance in branch grooves are so determined that the different gases are mixed at predetermined mixing ratios for delivery to the outlet ports. Further, the analyzer includes the gas mixing device and a measuring unit equipped with a plurality of gas measuring electrodes. The mixture gas from the gas mixing device is made to bubble through a buffer solution in a reservoir for producing a standard liquid measuring unit that is delivered at predetermined time intervals to the analyzer for calibration.

18 Claims, 4 Drawing Sheets

GAS MIXING DEVICE AND GAS ANALYZER MAKING USE OF THE SAME

This is a divisional application of Ser. No. 201,738, filed June 3, 1988 now U.S. Pat. No. 4,905,497.

BACKGROUND OF THE INVENTION

The present invention relates to a gas mixing device capable of forming a gaseous mixture of a predetermined mixing ratio and to a gas analyzer having such a gas mixing device.

The specification of the U.S. Pat. No. 3,464,434 discloses a device capable of continuously mixing two or more gases. This known art employs elongated tubes serving as flow resistance passages. Two or more different gases are introduced through the respective elongated tubes and are made to merge with each other so as to form a gaseous mixture. On the other hand, in the field of analyzers for measuring blood gases, a plurality of gas-containing standard liquids or a plurality of standard gases are used for the purpose of calibration. The preparation of the gaseous standards is conducted by extracting carbon dioxide, oxygen and nitrogen gases from the respective cylinders, allowing these gases to merge with each other and then bubbling the thus formed mixture through an aqueous solution. This type of art is disclosed in, for example, Japanese Patent Unexamined Publication No. 61-200458 corresponding to the U.S. Pat. No. 4,696,183. The present inventors have attempted to make use of the method disclosed in the U.S. Pat. No. 3,464,434 in the preparation of the standard liquid for blood gas analyzer. In this attempt, elongated tubes of stainless steel were used as the flow resistance tubes. Unfortunately, however, it is difficult to obtain a constant inside diameter over the entire length of the stainless steel tube. This makes it difficult to set the resistance value within a predetermined range of error. Thus, a predetermined resistance valve is obtained by cutting a steel tube to a length greater than a calculated length, measuring the flow resistance therethrough and thereafter repeating the process until the predetermined resistance value is obtained. The gas mixing device thus formed is large in size and heavy in weight.

SUMMARY OF THE INVENTION

Accordingly, an object of the present invention is to provide a gas mixing device which has a compact construction with reduced number of parts and which can mix a plurality of gases exactly in a desired proportion.

Another object of the present invention is to provide a gas analyzer which utilizes, for the purpose of calibration, standard gases which are formed by preparing a gaseous mixture exactly having a predetermined composition ratio, and causing the gaseous mixture to bubble in a liquid.

The gas mixing device of the present invention has a substrate having a plurality of grooves formed in the surface thereof, and a plate having a flat surface that is bonded to the substrate to cover the grooves. The substrate has a plurality of inlet grooves each branching into a plurality of gas passage grooves. At least one of the gas passage grooves merges with another gas passage groove which communicates with a different inlet groove. The gas passage grooves constitute the flow resistance passages, after the plate having flat smooth surface is bonded to the substrate.

The gas analyzer according to the present invention includes, in addition to the above-mentioned gas mixing device, a reservoir containing a liquid through which the gaseous mixture can be bubbled, a measuring unit having gas measuring electrodes, and means for selectively communicating the reservoir with the measuring unit.

In a preferred form of the present invention, a plurality of capillary grooves of different widths and lengths are formed by etching on a single substrate made of a material such as silicon. A plate having a flat smooth surface is bonded to the substrate so that flow resistance passages having desired resistance values are formed. The inlets for the different branching gases and the outlets for the different merged gases can also be formed by etching in the surface of the substrate. It is possible to arrange a plurality of capillary grooves having different resistance values and to combine them for providing on the same substrate a plurality of flow passage systems which are adapted for forming a plurality of gaseous mixtures of different mixing ratios. A plurality of gaseous mixtures thus formed are made to bubble through liquids in corresponding reservoirs, whereby standard wet mixture gases or standard gas liquids are obtained so as to be used for calibration.

DESCRIPTION OF THE PREFERRED EMBODIMENTS

In a preferred embodiment of the present invention, the capillary grooves formed in the surface of the substrate have widths and depths which are generally not greater than 1 mm. The source pressures of the gases from which the gases are introduced to the gas mixing tip are exactly equalized to each other so that the desired mixing ratio can be obtained solely on the basis of the difference in the flow resistances. In a preferred form of the invention, carbon dioxide gas and oxygen gas are mixed in the standard gas. The carbon dioxide gas is fed in a pure state from a gas cylinder, while the oxygen gas is supplied through an air compressor. Since air is a mixture of oxygen and nitrogen which is an inert gas, the oxygen content is, in general, not extremely high in the gaseous mixture.

In a preferred form of the present invention, the plate has a flat smooth surface and is provided with inlet ports which communicate with the respective gas inlet grooves and outlet ports which communicate with the respective mixture gas outlet grooves. Alternatively, these inlet ports and outlet ports may be provided in the substrate, instead of in the plate.

In a preferred form of the invention, the plate has a flat smooth surface and is constituted by a transparent glass plate, while the substrate is constituted by a silicon plate. The plate and the substrate are directly bonded by an anodic bonding method, without employing any bonding agent. The principle of the anodic bonding between silicon and glass is disclosed in the specification of U.S. Pat. No. 3,397,278. This bonding method, when applied to the present invention, offers an advantage that contamination caused by a bonding agent is avoided. The invention, however, does not exclude the use of a bonding agent for bonding the plate to the substrate. The use of a transparent glass plate as the plate having the flat smooth surface advantageously enables the user to visually check the flow passages in the gas mixing tip for any foreign matters brought into the flow passages.

Embodiments of the present invention will be described hereinunder with reference to the accompanying drawings.

Figure 2:
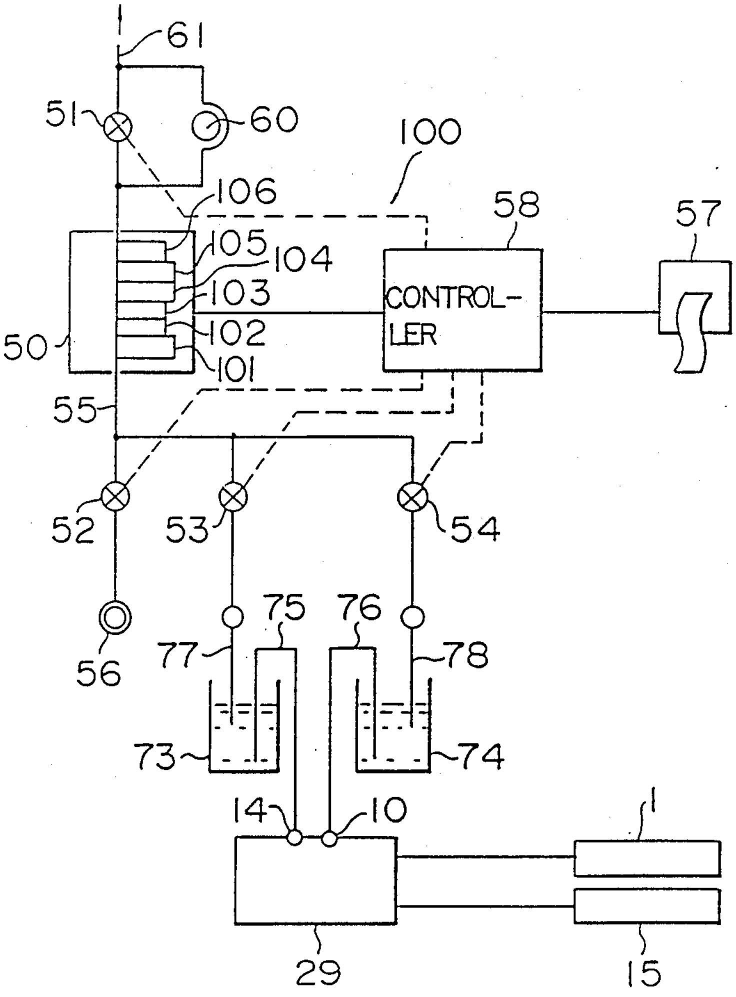
FIG. 2 is a schematic illustration of the whole portion of a gas analyzer as an embodiment of the present invention.

FIG. 2 shows an analyzer for analyzing blood gases and electrolytes, as an embodiment of the present invention.

Referring to FIG. 2, the analyzer generally denoted by 100 has a gas mixing device 29, which is adapted to be supplied with carbon dioxide gas ($CO_2$) from a carbon dioxide gas cylinder 1, and also with air from an air compressor 15. In the gas mixing device 29, the carbon dioxide gas and air are mixed at different mixing ratios so as to form two or three types of mixture gas having different mixing ratios. A mixture gas of a comparatively low carbon dioxide content is discharged from the second outlet port 14 of the gas mixing device 29, while a mixture gas having a comparatively high carbon dioxide content is discharged from a first outlet port 10. For instance, a second mixture gas derived from the outlet port 14 contains 5.6 vol % of $CO_2$ and 19.82 vol % of $O_2$, while the first mixture gas derived from the outlet port 10 contains 11.2 vol % of $CO_2$ and 18.64 vol % of $O_2$.

Sample gas liquid tanks 73 and 74 accommodate a buffer liquid which contain 25.0 mM of disodium hydrogenphosphate ($Na_2HPO_4$), 12.0 mM of dipotassium hydrogenphosphate ($KH_2PO_4$), 7.8 mM of sodium dihydrogenphosphate $NaH_2PO_4$), 13.2 mM of sodium hydrocarbonate, 34.0 mM of sodium chloride (NaCl) and 42.0 mM of lithium chloride. The gas derived from the outlet port 14 is bubbled into the liquid in the liquid tank 73 through the flow passage 75, while the mixture gas from the outlet port 10 is bubbled into the liquid in the liquid tank 74 through the flow passage 76. In consequence, standard gas liquids having predetermined different concentrations of carbon dioxide and oxygen are prepared. The mixing of $CO_2$ and air in the mixing device 29 and the accompanying bubbling are continuously conducted throughout the period of operation of the analyzer 100. The liquid tanks 73 and 74 are adapted to be supplied with supplemental buffer liquid.

The analyzer 100 has a specimen inlet 56, a sensor unit 50, a controller 58. The specimen inlet 56 is normally covered with a lid (not shown) and is opened when the specimen is to be introduced. The sensor unit 50 has a flow cell provided with a specimen flow passage in which are disposed a plurality of sensors. These sensors are: a pH sensing electrode 101, a carbon dioxide gas sensing electrode 102, an oxygen sensing electrode 103, a sodium ion sensing electrode 104, a potassium ion sensing electrode 105 and a reference electrode 106. The controller 58 is designed to control operation of various elements such as solenoid valves 51, 52, 53 and 54 and a pump 60, and to process voltage or current signals from the respective sensing electrodes. The carbon dioxide gas sensing electrode 102 is an electrode of Severinghaus type, while the oxygen sensing electrode 103 is a Clerk type electrode.

A description will be made hereinunder as to the calibration of this analyzer. As peristaltic pump 60 is started after opening the solenoid valve 53, the second standard gas liquid in the liquid tank 73 is introduced into the flow cell of the sensor unit 50, through the flow passage 77, solenoid valve 53 and the flow passage 55. The electrical output corresponding to the $CO_2$ concentration derived from the measuring electrode 102 and the electrical output corresponding to the $O_2$ concentration derived from the sensing electrode 103 are measured. At the same time, the pH value, sodium ion concentration and potassium ion concentration are measured through the measurement of the electrical outputs derived from the respective sensing electrodes. The measuring signals are processed by the controller 58 and the results are stored in the controller 58.

Subsequently, the solenoid valve 53 is closed and the pump 60 is started. Thereafter, the solenoid valve 54 is opened so that the first standard gas liquid in the liquid tank 74 is introduced into the flow cell of the sensor unit 50 through the flow passage 78, solenoid valve 54 and the flow passage 55. In the same way as in the case of the second standard liquid, the concentrations of components of the first standard gas are measured by the respective sensing electrodes and the results of the measurement are stored in the controller 58. Then, the controller 58 computes the calibration curve representing the relationship between the concentrations of the respective components and the levels of the electrical outputs, from the data derived from the first and the second sample gas liquids, and stores the calibration curve.

The calibration is repeatedly conducted at a predetermined time interval. For instance, the analyzer conducts the calibration every one hour and is always maintained in a state ready for receiving and measuring a blood sample. This automatic calibration is performed under the control of the controller 58.

For the purpose of measuring the blood specimen to be analyzed, the operator opens the lid of the specimen inlet 56. Linked to the lid opening action of the operator, a switch (not shown) operates to produce a signal indicative of the fact that the specimen has been introduced. This signal is delivered to the controller 58 so that the controller 58 operates to open the solenoid valves 51 and 52. Subsequently, the operator inserts the needle of an injector containing the gathered blood into the specimen inlet and the plunger of the injector is pushed to inject the blood thereinto. Since the solenoid valve 51 has been opened while the drain 61 of the flow passage system is opened to the atmosphere, the flow cell of the sensor unit 50 is filled up with the blood as a result of the injection. In this state, electrical signals corresponding to the concentrations of $CO_2$, $O_2$, $Na^+$ and $K^+$, as well as the pH value, of the blood are derived from the respective sensing electrodes, and the controller 58 operates to compute the concentrations of the respective components from the calibration curves corresponding to the respective components. The thus computed values are displayed on a CRT and are printed by the printer 57.

The analyzer shown in FIG. 2 is capable of measuring the content or concentration of electrolyte, in addition to the gaseous components of the blood. The invention, however, can be applied to an analyzer of the type which is capable of measuring only the gas components. When only the contents or concentrations of the gas components are to be measured, the liquid tanks 73, 74 and the sensor unit 50 may be slightly modified. Namely, the sensor unit 50 is equipped with a gas measuring electrode but is devoid of the electrode for measuring the electrolyte. The liquid tanks 73 and 74 receive distilled water and the end openings of the flow passages 77 and 78 are positioned apart from the liquid surface. Therefore, during the calibration a mixed standard gas including a moisture content is introduced into the sensor unit, instead of a sample gas liquid. When it is desired to measure the gaseous components of the blood, calibration curves obtained through measurement of a plurality of kinds of mixture standard gas are to be converted so as to correspond to gases dissolved in the blood. Otherwise, the measured values may be converted instead of the gas calibration curves.

The construction of the gas mixing device incorporated in the analyzer of FIG. 2 will be described with reference to FIG. 1.

Figure 1:
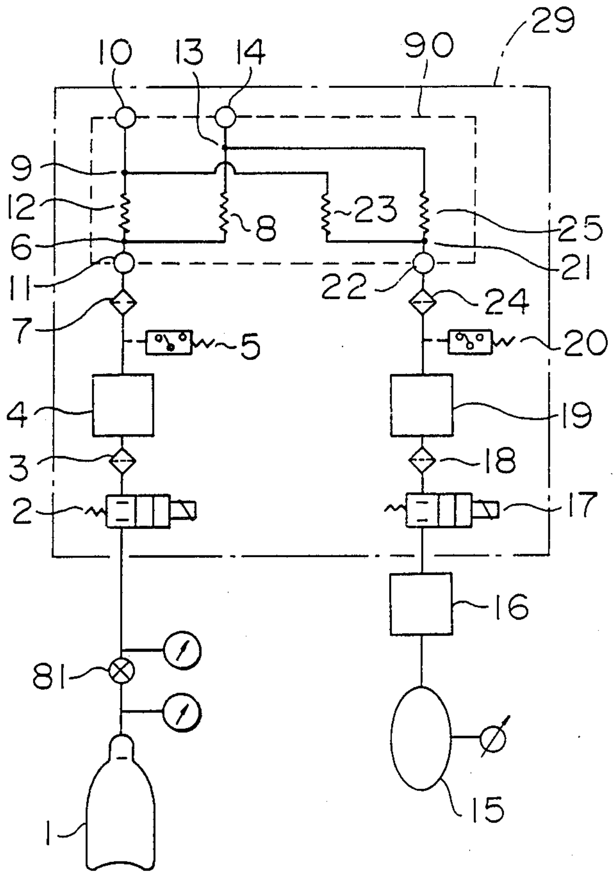
FIG. 1 is a schematic illustration of a gas mixing device which is used in an embodiment shown in FIG. 2.

FIG. 1 shows the gas mixing device of the analyzer of FIG. 2. The gas mixing device has a carbon dioxide gas cylinder 1 to which is connected a pressure reducing valve 81. The carbon dioxide gas is depressurized by the pressure reducing valve down to 2 $kgf/cm^2$ atg, and is introduced to a low-pressure precision pressure reducing valve 4 of non-relief type, through a normally closed two-way solenoid valve 2 and a filter 3 for arresting fine particles. At the downstream side of the pressure reducing valve 4, the pressure of the carbon dioxide gas is maintained at a constant level, e.g., 0.3 $kgf/cm^2$, ranging between 0.2 and 0.4 $kgf/cm^2$ at the gauge pressure. When an abnormal pressure is established at the downstream side, the pressure switch 5 operates to activate an alarm. The carbon dioxide gas regulated to the predetermined pressure is introduced into a gas mixing tip 90, through a filter 7 and a carbon dioxide gas inlet port 11 of the gas mixing tip 90.

The gas mixing tip 90 provided in the gas mixing device 29 is capable of preparing two different types of mixture gas having different mixing ratios. The carbon dioxide gas introduced through the inlet port 11 is made to shunt into two flow resistance passages at a branching point 6. Namely, one portion of the carbon dioxide gas is introduced into a capillary flow resistance passage 12 and is supplied into the flow passage 76 of FIG. 2 through the merging point 9 and the first outlet port 10, while the other portion of the carbon dioxide gas is introduced into the capillary flow resistance passage 8 and is introduced into the flow passage 75 of FIG. 2 through the merging point 13 and the second outlet port 14.

The air compressor 15, which serves as a source of oxygen, is capable of discharging air at a flow rate of 100 ml/min. and at a delivery pressure of 0.7 $kgf/cm^2$. The air from the air compressor 15 is introduced into the low-pressure precision pressure reducing valve 19 through a buffer tank 16 and a normally-closed two-way solenoid valve 17, after removal of fine particles by the filter 18. At the downstream side of this pressure reducing valve 19, the air pressure is maintained at a constant level, e.g., 0.3 $kgf/cm^2$, within a range between 0.2 and 0.4 $kgc/cm^2$atg. This constant pressure of air is equal to the pressure of the carbon dioxide gas established at the downstream side of the carbon dioxide gas pressure reducing valve 4. Thus, the gases available at the inlet side of the gas mixing tip in the state before the mixing have an identical pressure. In the event of any abnormality in the pressure at the downstream side of the pressure reducing valve 19, a pressure switch 20 is turned on to activate an alarm. The air maintained at the predetermined pressure is introduced into the gas mixing tip 90 through a filter 24 and a air inlet port 22 of the gas mixing tip 90. The air introduced through the inlet port 22 is made to shunt into two flow resistance passages at a shunting point 21. Namely, one portion of the air is introduced into a capillary flow resistance passage 23 and is made to merge in the carbon dioxide gas at the merging point 9. The thus formed mixture of air and carbon dioxide gas flows into the first outlet port 10. The other portion of air is caused to merge in the carbon dioxide gas at the merging point 13, through a capillary flow resistance passage 25, and the thus formed mixture is introduced into the second outlet port 14.

The level of the flow resistances in the elongated capillary flow resistance passages 8 and 12 are so determined that the flow rate of 1.2 ml/min is obtained at the outlet ports 10 and 14 when the carbon dioxide gas alone is introduced into the device when the ambient air pressure is 760 mmHg.

On the other hand, the level of the flow resistance in the elongated capillary flow resistance passages 23 and 25 is determined such that flow rates of air of 17.11 ml/min and 16.05 ml/min are obtained, respectively, at the outlet ports 10 and 14, when the ambinet air pressure is 760 mmHg. The width and depth (or diameter) of the groove constituting the capillary flow passage are finished such that the error in the flow resistance is not greater than 2%.

Figure 3:
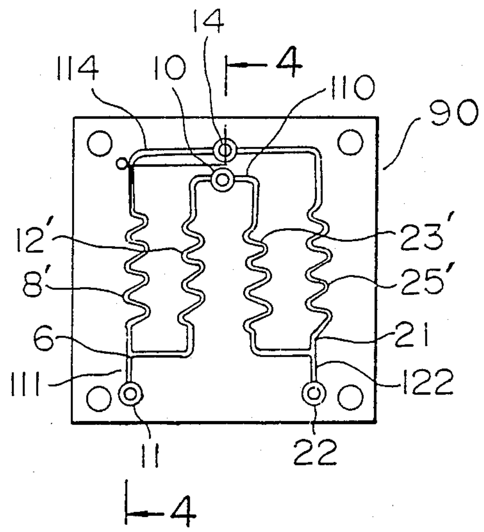
FIG. 3 is a plan view of a gas mixing tip incorporated in the embodiment shown in FIG. 2.
Figure 4:
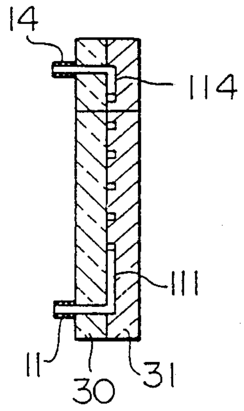
FIG. 4 is a sectional view taken along the line 4—4 of FIG. 3.

A description will be made hereinunder as to the construction of the gas mixing tip 90 of FIG. 1, with specific reference to FIGS. 3 and 4.

Four capillary grooves constituting gas passage grooves are formed by etching on one side of a single rectangular silicon substrate 31. The capillary groove denoted by 8′, which corresponds to the capillary flow resistance passage 8 shown in FIG. 1, is sized such as to have a width, depth and length of 0.2 mm, 0.2 mm and 3968 mm, respectively. The capillary groove denoted by 12′, which corresponds to the capillary flow resistance passage 12 shown in FIG. 1, is sized such as to have a width, depth and length of 0.35 mm, 0.35 mm and 1902 mm, respectively. The capillary groove denoted by 23′, which corresponds to the capillary flow resistance passage 23 shown in FIG. 1, is sized such as to have a width, depth and length of 0.2 mm, 0.2 mm and 3968 mm, respectively. Finally, the capillary groove denoted by 25′, which corresponds to the capillary flow resistance passage 25 shown in FIG. 1, is sized such as to have a width, depth and length of 0.35 mm, 0.35 mm and 3230 mm, respectively. Thus, the cross-sections and the lengths of the respective grooves are determined such that predetermined levels of flow resistance are produced in the respective flow passages.

These flow resistance grooves formed on the surface of the silicon substrate 31 are communicated with the inlet ports and the outlet ports through grooves 111, 122, 110 and 114 which are also formed on the surface of the silicon substrate 31. The cross-sectional areas of the respective communication grooves are preferably determined to be greater than those of the flow resistance grooves. The inlet groove 111 communicating with the inlet port 11 for the carbon dioxide gas has a shunting point 6, while the inlet groove 122 leading to the air inlet port 22 has a shunting point 21. The outlet groove 110 communicating with the outlet port 10 has a merging point beneath the outlet port 10 in FIG. 3, while the outlet groove 114 communicating with the outlet port 14 has a merging point beneath the outlet port 14 of FIG. 3.

A transparent glass plate 30 having a flat smooth surface is anode-bonded directly to the side of the silicon substrate 31 having the grooves. As a result of the anodic bonding, the grooves formed in the silicon substrate 31 form flow passages. Inlet ports 11, 22 and outlet ports 10, 14 are secured to the glass plate 30. As has been described with reference to FIGS. 1 and 2, when carbon dioxide gas and air are supplied to the gas mixing device 29, two types of mixture gases, having different mixing ratios corresponding to the flow resistances in the respective capillary resistance passages, i.e., the cross-sectional areas and lengths of the passages, are derived from the outlet ports 10 and 14 of the gas mixing device. More specifically, when the gas mixing device has grooves which are sized as specified above, a gas mixture containing 19.82 vol % of oxygen and 5.6 vol % of carbon dioxide is derived from the outlet port 14, while the outlet port 10 delivers a mixture gas containing 18.59 vol % of oxygen and 11.2 vol % of carbon dioxide.

Figure 5:
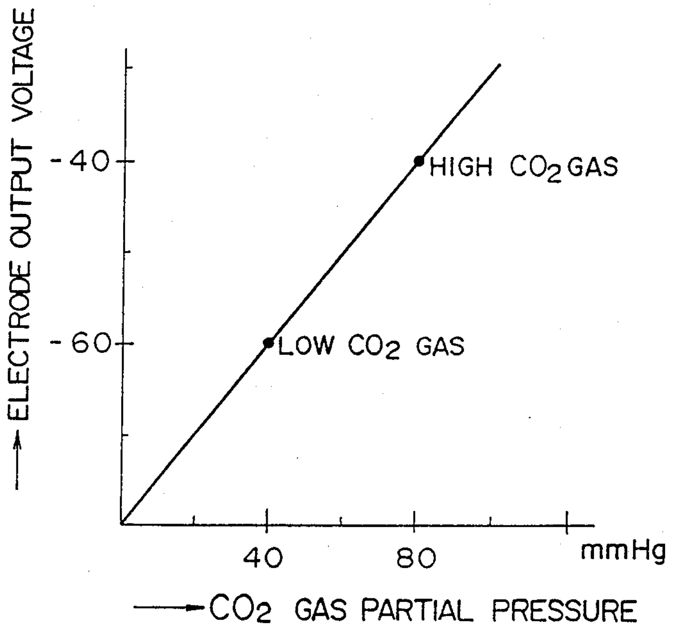
FIG. 5 is an illustration of a calibration curve.

FIG. 5 illustrates an example of a calibration curve obtained in the course of the calibration operation conducted in the embodiment as shown in FIG. 2. FIG. 5 shows particularly a calibration curve for the carbon dioxide gas. However, it is to be understood that a similar calibration curve may be drawn also for oxygen.

A description will be given hereinunder as to a gas mixing tip which is used in another embodiment of the present invention, with specific reference to FIG. 6. In this case, the gas mixing tip 290 includes a disk-shaped silicon substrate 231 and a disk-shaped flat glass plate 230 having a flat smooth surface. The silicone substrate 231 in the form of a single silicon wafer has capillary flow resistance grooves formed therein in spiral forms. The glass plate 230 bonded to the silicon substrate 231 is provided with a $CO_2$ inlet port 211, an air inlet port 222, a first mixture gas outlet port 210 and a second mixture gas outlet port 214.

Figure 6:
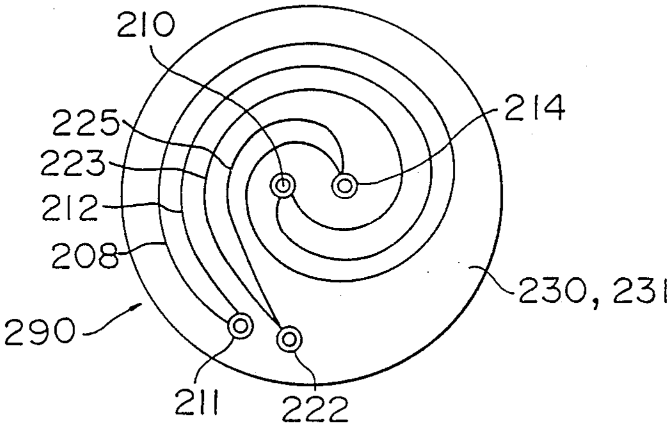
FIG. 6 is an illustration of a gas mixing tip used in another embodiment of the present invention.

FIG. 6 illustrates a mask pattern which is optimum from the view point of etching speed, utility factor of area and planar arrangement of the passages. Namely, the mask pattern includes, successively, the radially outermost groove (208) of $CO_2$ high flow resistance, the groove (212) of $CO_2$ low flow resistance, the groove (223) of $O_2$ low flow resistance and the radially innermost groove (225) of $O_2$ high flow resistance.

As has been described, according to the present invention, it is possible to prepare two types of gases having different compositions, from carbon dioxide gas supplied from a carbon dioxide gas cylinder and the atmospheric air. These two types of gases provide standard liquids for calibration for a gas analyzer which are available for a long period of time, e.g., more than 10 months. In addition, the invention provides a capillary flow resistors of exact flow resistance simply by etching on a single substrate. Thus, the invention provides a gas mixing device which can be easily mass-produced has reduced weight and size, and is not sensitive to the influence of temperature.

What is claimed is:

1. A gas mixing device for mixing a plurality of gases, comprising:

a substrate having a plurality of grooves formed thereon by etching including a plurality of inlet grooves and at least one outlet groove, each of said inlet grooves being branched into a plurality of gas passage grooves, and each of said at least one outlet groove being connected with at least two of said inlet grooves through said gas passage grooves, and said inlet grooves and said at least one outlet groove having dimensions of cross-section greater than said gas passage grooves, and said gas passage grooves having width and depth dimensions that are smaller than 1 mm;

a plate having a flat smooth surface, a plurality of inlet ports each communicating with a respective one of said inlet grooves and through each of which a gas to be mixed is introduced from respective gas sources, and at least one outlet port which is to be communicated with a respective said at least one outlet groove and through which a gas mixture is discharged, said plate being bonded at said flat smooth surface to said substrate to define therebetween gas passages which have predetermined flow resistances and are constituted by said gas passage grooves, whereby gases to be mixed together are introduced from said inlet ports into said at least one outlet groove and are mixed together into the gas mixture; and pressure regulating means for each of said inlet ports for maintaining the pressures of a plurality of gases to be supplied to said inlet grooves substantially at the same level.

2. A gas mixing device according to claim 1, wherein said plurality of gas passage grooves have cross-sectional areas and lengths which are determined to produce desired levels of flow resistance.

3. A gas mixing device according to claim 1, wherein said plurality of gases include carbon dioxide gas and air.

4. A gas mixing device according to claim 1, wherein gases passing through said respective gas passages meet one another at said outlet groove and flow out from said device through said outlet port.

5. A gas mixing device according to claim 4, wherein each of said gas passage grooves has a uniform cross-sectional area along the length thereof.

6. A gas mixing device according to claim 5, wherein said pressure regulating means maintains a constant pressure of the gas to be supplied to the inlet ports between 0.2 $kgf/cm^2$ and 0.4 $kgf/cm^2$.

7. A gas mixing device according to claim 6, wherein said substrate is made of silicon, and said plate is made of transparent glass, and wherein said substrate and said plate are bonded together by means of anodic bonding.

8. A gas mixing device according to claim 5, wherein said substrate is made of silicon, and said plate is made of transparent glass, and wherein said substrate and said plate are bonded together by means of anodic bonding.

9. A gas mixing device according to claim 4, wherein said pressure regulating means maintains a constant pressure of the gas to be supplied to the inlet ports between 0.2 $kgf/cm^2$ and 0.4 $kgf/cm^2$.

10. A gas mixing device according to claim 9, wherein said substrate is made of silicon, and said plate is made of transparent glass, and wherein said substrate and said plate are bonded together by means of anodic bonding.

11. A gas mixing device according to claim 4, wherein said substrate is made of silicon, and said plate is made of transparent glass, and wherein said substrate and said plate are bonded together by means of anodic bonding.

12. A gas mixing device according to claim 1, wherein each of said gas passage grooves has a uniform cross-sectional area along the length thereof.

13. A gas mixing device according to claim 12, wherein said pressure regulating means maintains a constant pressure of the gas to be supplied to the inlet ports between 0.2 $kgf/cm^2$ and 0.4 $kgf/cm^2$.

14. A gas mixing device according to claim 13, wherein said substrate is made of silicon, and said plate is made of transparent glass, and wherein said substrate and said plate are bonded together by means of anodic bonding.

15. A gas mixing device according to claim 12, wherein said substrate is made of silicon, and said plate is made of transparent glass, and wherein said substrate and said plate are bonded together by means of anodic bonding.

16. A gas mixing device according to claim 1, wherein said pressure regulating means maintains a constant pressure of the gas to be supplied to the inlet ports between 0.2 $kgf/cm^2$ and 0.4 $kgf/cm^2$.

17. A gas mixing device according to claim 16, wherein said substrate is made of silicon, and said plate is made of transparent glass, and wherein said substrate and said plate are bonded together by means of anodic bonding.

18. A gas mixing device according to claim 1, wherein said substrate is made of silicon, and said plate is made of transparent glass, and wherein said substrate and said plate are bonded together by means of anodic bonding.

* * * * *